US012173946B2

(12) United States Patent
Park et al.

(10) Patent No.: US 12,173,946 B2
(45) Date of Patent: Dec. 24, 2024

(54) REFRIGERATOR

(71) Applicant: SAMSUNG ELECTRONICS CO., LTD., Suwon-si (KR)

(72) Inventors: Sangmin Park, Suwon-si (KR); Jin Jeong, Suwon-si (KR); Juno Kwon, Suwon-si (KR); Seokjun Yoon, Suwon-si (KR); Gahyeong Kim, Suwon-si (KR); Seokjun Son, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 380 days.

(21) Appl. No.: 17/679,520

(22) Filed: Feb. 24, 2022

(65) Prior Publication Data

US 2022/0275988 A1 Sep. 1, 2022

Related U.S. Application Data

(63) Continuation of application No. PCT/KR2021/019681, filed on Dec. 23, 2021.

(30) Foreign Application Priority Data

Feb. 26, 2021 (KR) ........................ 10-2021-0026462

(51) Int. Cl.
*F25C 1/25* (2018.01)
*B67D 1/00* (2006.01)
(Continued)

(52) U.S. Cl.
CPC .............. *F25C 1/24* (2013.01); *B67D 1/0014* (2013.01); *B67D 1/1277* (2013.01); *F25C 1/25* (2018.01);
(Continued)

(58) Field of Classification Search
CPC . B67D 2210/0001; B67D 1/1277; F25C 1/24; F25C 1/25; F25C 2400/08; F25C 2400/10; F25C 2400/14
See application file for complete search history.

(56) References Cited

U.S. PATENT DOCUMENTS 9,999,863 B2 6/2018 Jeong et al.
10,584,908 B2 3/2020 Kim
(Continued)

FOREIGN PATENT DOCUMENTS

EP 2 664 880 B1 9/2018
JP 10-103827 A 4/1998
(Continued)

OTHER PUBLICATIONS

International Search Report dated Apr. 22, 2022 in PCT Application No. PCT/KR2021/019681.
(Continued)

*Primary Examiner* — Nael N Babaa
(74) *Attorney, Agent, or Firm* — STAAS & HALSEY LLP

(57) ABSTRACT

A refrigerator comprises a body comprising a storage compartment, the storage compartment comprising a first storage compartment, and a second storage compartment, and a partition wall to separate the storage compartment into the first storage compartment and the second storage compartment, a first control valve configured to control a flow of water received from an external water supply source, an ice maker configured to generate ice using the water discharged from the first control valve, a second control valve configured control a flow of the water discharged from the first control valve, a dispenser comprising an operating lever configured to supply the water received from the second valve, and an automatic water supply device configured to supply the water received from the second valve to a water
(Continued)

container and configured to control the water container to be filled with a predetermined amount of water.

16 Claims, 15 Drawing Sheets

(51) Int. Cl.
*B67D 1/12* (2006.01)
*F25C 1/24* (2018.01)

(52) U.S. Cl.
CPC .. *B67D 2210/0001* (2013.01); *F25C 2400/08* (2013.01); *F25C 2400/10* (2013.01); *F25C 2400/14* (2013.01)

(56) References Cited

U.S. PATENT DOCUMENTS

| | | | |
|---|---|---|---|
| 10,794,628 B2 | 10/2020 | Park et al. | |
| 10,928,114 B2 | 2/2021 | An et al. | |
| 2006/0260349 A1 | 11/2006 | Coulter et al. | |
| 2009/0025826 A1* | 1/2009 | Meuleners | F25D 23/126 141/351 |
| 2012/0111048 A1 | 5/2012 | Kim et al. | |
| 2015/0330695 A1* | 11/2015 | Miller | F25D 17/06 62/340 |
| 2018/0187964 A1* | 7/2018 | Park | F25D 23/02 |
| 2019/0101317 A1* | 4/2019 | Park | F25C 5/24 |

FOREIGN PATENT DOCUMENTS

| | | |
|---|---|---|
| JP | 2735170 B2 | 4/1998 |
| JP | 10-148437 A | 6/1998 |
| JP | 2012-233688 A | 11/2012 |
| KR | 10-2007-0044247 A | 4/2007 |
| KR | 10-2012-0069686 | 6/2012 |
| KR | 10-1251654 B1 | 4/2013 |
| KR | 10-2014-0061861 A | 5/2014 |
| KR | 10-2016-0023528 | 3/2016 |
| KR | 10-2016-0136659 | 11/2016 |
| KR | 10-2018-0080021 | 7/2018 |
| KR | 10-2018-0080056 | 7/2018 |
| KR | 10-2019-0028908 | 3/2019 |

OTHER PUBLICATIONS

Office Action dated Mar. 7, 2024 issued in European Application No. EP 21 92 8248.

* cited by examiner

REFRIGERATOR

CROSS-REFERENCE TO RELATED APPLICATION(S)

This application is a continuation application, under 35 U.S.C. § 111(a), of international application No. PCT/KR2021/019681, filed on Dec. 23, 2021, which claims priority to Korean Patent Application No. 10-2021-0026462, filed on Feb. 26, 2021, in the Korean Intellectual Property Office, the disclosure of which is incorporated by reference herein in its entirety.

BACKGROUND

1. Field

The disclosure relates to a refrigerator, and more particularly, to a refrigerator including a dispenser configured to supply water by manipulating an operating lever, an automatic water supply device automatically configured to, in response to mounting a water container, supply water to the water container, and an ice maker configured to generate ice.

2. Description of Related Art

A refrigerator is a home appliance that includes a body including a storage compartment, and a cold air supply device configured to supply cold air to the storage compartment to keep food fresh.

The refrigerator may be provided with a dispenser configured to allow a user to receive water from the outside of the refrigerator by manipulating an operating lever without opening a door.

In addition, the refrigerator is provided with an automatic water supply device configured to, in response to mounting a water container, supply water to the water container to allow the water container to be filled with a predetermined amount of water. When a user needs a large amount of water at once, the user may use the water container in which water is filled in advance.

In addition, the refrigerator is also provided with an ice maker configured to generate ice. Conventionally, a user directly supplies water to the ice maker, which may reduce user convenience.

SUMMARY

Therefore, it is an aspect of the disclosure to provide a refrigerator including a water supply flow path provided to supply water from an external water supply source to a dispenser, an automatic water supply device, and an ice maker.

It is another aspect of the disclosure to provide a refrigerator including a water supply flow path provided to supply water from a water supply container filled by a user to a dispenser, an automatic water supply device, and an ice maker.

It is another aspect of the disclosure to provide a refrigerator capable of preventing residual water from accumulating on a water supply flow path supplying water to an ice maker.

Additional aspects of the disclosure will be set forth in part in the description which follows and, in part, will be obvious from the description, or may be learned by practice of the disclosure.

In accordance with an aspect of the disclosure, a refrigerator includes a body including a storage compartment, the storage compartment comprising a first storage compartment, and a second storage compartment, and a partition wall to separate the storage compartment into the first storage compartment and the second storage compartment, a first control valve configured to control a flow of water received from an external water supply source, an ice maker connected to the first control valve and configured to generate ice using the water discharged from the first control valve, a second control valve connected to the first control valve and configured control a flow of the water discharged from the first control valve, a dispenser including an operating lever connected to the second control valve and configured to supply the water received from the second valve by an operation of the operating lever, and an automatic water supply device, connected to the second control valve, configured to supply the water received from the second valve to a water container and configured to control the water container to be filled with a predetermined amount of water, the first control valve selectively guides the water received from the external water supply source to the ice maker or to the second control valve, and the second control valve selectively guides the water received from the first control valve to the dispenser or the automatic water supply device.

The refrigerator may further include a water supply device configured to supply the water received from the first control valve to the ice maker.

The water supply device may be configured to supply the water received from the first control, which is valve arranged in the first storage compartment, to the ice maker arranged in the second storage compartment, by penetrating the partition wall.

The ice maker may include a first ice maker configured to generate a first type of ice, and a second ice maker configured to generate a second type of ice which is different from the first type and arranged in parallel with the first ice maker.

The first control valve may include a first inlet port connected to the external water supply source to receive water therethrough, a first outlet port to discharge the water received from the external water supply source to the first ice maker therethrough, a second outlet port to discharge the water received from the external water supply source to the second ice maker therethrough, and a third outlet port to discharge the water received from the external water supply source to the second control valve therethrough.

The refrigerator may further include a water filter disposed between the external water supply source and the first control valve to purify water supplied from the external water supply source, and a water tank disposed between the first control valve and the second control valve to store water purified by the water filter.

The second control valve may include a second inlet port connected to the third outlet port of the first control valve to receive the water discharged from the first control valve, a fourth outlet port to supply the water received from the first control valve to the dispenser, and a fifth outlet port to supply the water received from the first control valve to the automatic water supply device.

The refrigerator may further include a flow path formed by connecting the first control valve to the ice maker, and including a connection pipe provided upstream of the flow path and a connection hose provided downstream of the flow path.

An inner diameter of the connection hose may be greater than an inner diameter of the connection pipe.

The connection hose may include an inlet through which water is introduced, an outlet through which water is discharged, and a bent portion disposed between the inlet and the outlet.

The bent portion may be positioned lower than a position of the inlet.

The refrigerator may further include an inner door rotatably coupled to the body and having an inner storage space therein, and an outer door rotatably disposed in front of the inner door to close the inner storage space.

The dispenser and the automatic water supply device may be disposed in the inner storage space of the inner door.

The first control valve may be arranged in the first storage compartment.

The ice maker may be arranged in the second storage compartment.

The second control valve may be arranged in the inner door.

The first storage compartment and the second storage compartment may be arranged vertically.

The partition wall may be arranged horizontally.

A refrigerator comprises a body comprising a storage compartment, the storage compartment comprising a first storage compartment, and a second storage compartment, and a partition wall to separate the storage compartment into the first storage compartment and the second storage compartment, a water supply container to store water and configured to be withdrawable from the second storage compartment, a first control valve configured to control a flow of water received from the water supply container, a pump configured to supply the water stored in the water supply container to the first control valve, an ice maker connected to the first control valve and configured to generate ice using the water discharged from the first control valve, a second control valve connected to the first control valve and configured control a flow of the water discharged from the first control valve, a dispenser comprising an operating lever, connected to the second control valve and configured to supply the water received from the second valve by an operation of the operating lever, and an automatic water supply device, connected to the second control valve, configured to supply the water received from the second valve to a water container and configured to control the water container to be filled with a predetermined amount of water.

The first control valve selectively guides the water received from the water supply container by the pump to the ice maker or to the second control valve, and the second control valve selectively guides the water received from the first control valve to the dispenser or the automatic water supply device.

A return valve is connected to the first control valve to control a flow of the water discharged from the first control valve to the ice maker.

the return valve includes an inlet to receive the water discharged from the first control valve therethrough, a first outlet through which the water received through the inlet is supplied to the ice maker, and a second outlet through which the water received through the inlet is supplied to the water supply container.

The second outlet is positioned higher than a position of the first outlet.

A collection flow path is formed between the return valve and the water supply container and one end of the collection flow path connected to an upper side of the water supply container is positioned higher than a full water level of the water supply container.

The water supply device is configured to supply the water received from the first control valve, which is arranged in the first storage compartment, to the ice maker arranged in the second storage compartment, by penetrating the partition wall.

In accordance with another aspect of the disclosure, a refrigerator includes a body including a first storage compartment, and a second storage compartment having an internal temperature less than the first storage compartment, a dispenser including an operating lever and configured to supply water by an operation of the operating lever, an automatic water supply device configured to supply water to a water container to allow the water container to be filled with a predetermined amount of water, an ice maker arranged in the second storage compartment to generate ice, a water supply container configured to be withdrawable from the second storage compartment, and a pump configured to move water from the water supply container to the ice maker, the dispenser or the automatic water supply device.

The refrigerator may further include a first control valve provided to guide water supplied from the water supply container to the ice maker or to the dispenser and the automatic water supply device, and a second control valve provided to guide water supplied from the first control valve to the dispenser or the automatic water supply device.

The refrigerator may further include a return valve arranged on a flow path provided to connect the first control valve to the ice maker.

The return valve may include an inlet to which water is supplied from the first control valve, a first outlet provided to supply water to the ice maker and a second outlet provided to communicate with the outside air.

The second outlet may be positioned higher than the first outlet.

The second outlet may be provided with a collection flow path connected to an upper side of the water supply container.

One end of the collection flow path connected to the upper side of the water supply container may be positioned higher than a full water level of the water supply container.

The refrigerator may further include a water supply device configured to supply water from the first control valve to the ice maker.

The water supply device may be configured to supply water from the first control valve arranged in the first storage compartment to the ice maker arranged in the second storage compartment, by penetrating a partition wall.

The refrigerator may further include an inner door rotatably coupled to the body and an outer door rotatably provided in front of the inner door.

The dispenser and the automatic water supply device may be provided in the inner door.

The first control valve may be arranged in the first storage compartment.

The ice maker may be arranged in the second storage compartment.

The second control valve may be arranged in the inner door.

The first storage compartment and the second storage compartment may be arranged vertically.

The partition wall may be provided horizontally.

BRIEF DESCRIPTION OF THE DRAWINGS

These and/or other aspects of the disclosure will become apparent and more readily appreciated from the following description of embodiments, taken in conjunction with the accompanying drawings of which.

DETAILED DESCRIPTION

Figure 1:
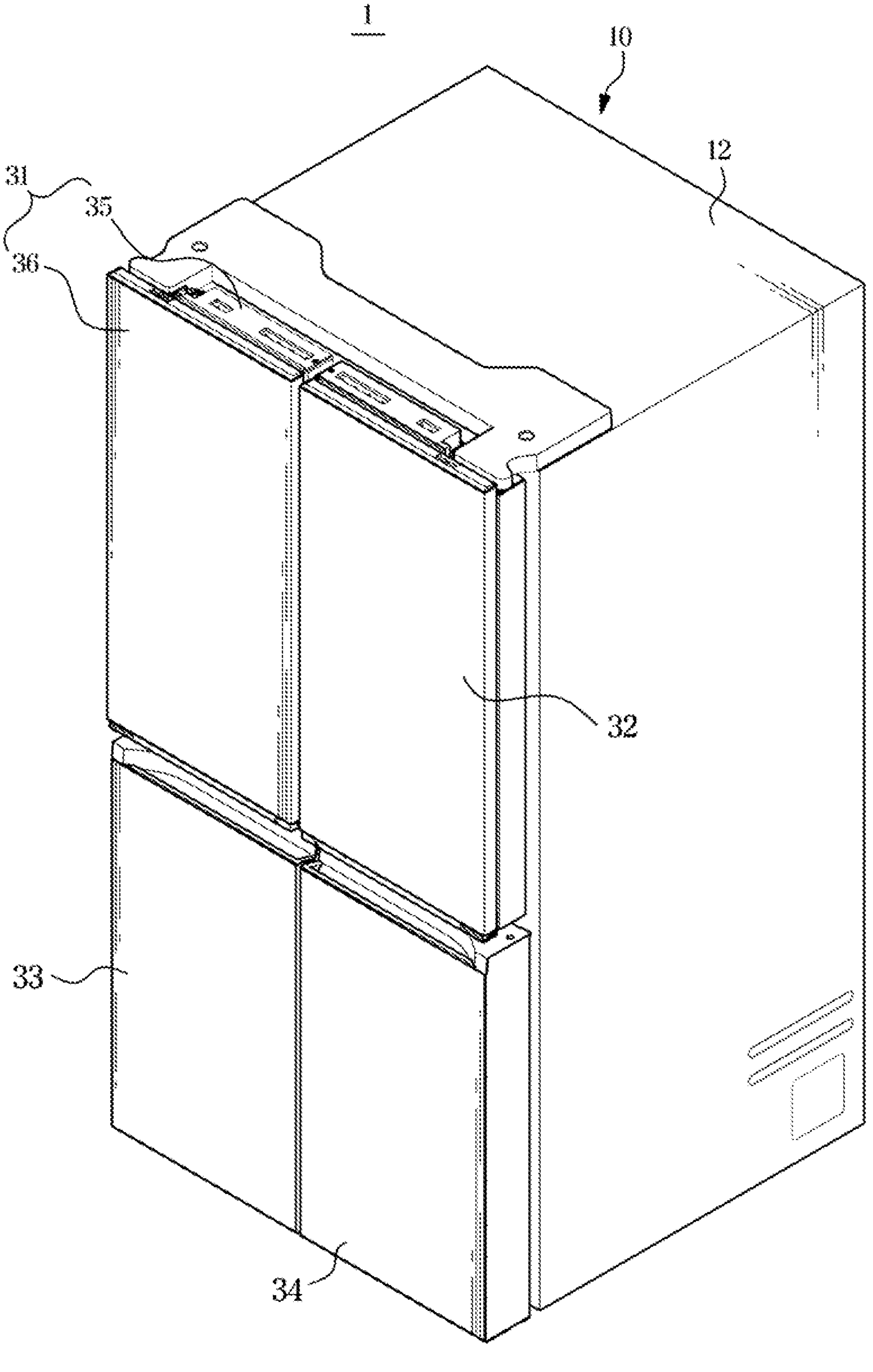
FIG. 1 is a perspective view illustrating an exterior of a refrigerator according to an embodiment of the disclosure.

Embodiments described in the disclosure and configurations illustrated in the drawings are merely examples of the embodiments of the disclosure, and the scope of the disclosure should be understood to include various modifications, equivalents, and/or alternatives at the time of filing of the present application to replace the embodiments and drawings of the disclosure.

Also, the terms used herein are used to describe the embodiments and are not intended to limit and/or restrict the disclosure. The singular forms "a," "an" and "the" are intended to include the plural forms as well, unless the context clearly indicates otherwise. In this disclosure, the terms "including", "having", and the like are used to specify features, numbers, steps, operations, elements, components, or combinations thereof, but do not preclude the presence or addition of one or more of the features, elements, steps, operations, elements, components, or combinations thereof.

It will be understood that, although the terms first, second, third, etc., may be used herein to describe various elements, but is should not be limited by these terms. These terms are only used to distinguish one element from another element, and the used ordinal number may do not indicate the arrangement order, manufacturing order, or importance between the components.

In the following detailed description, the terms of "front side", "rear side", "upper portion", "lower portion", "upper end", "lower end" and the like may be defined by the drawings, but the shape and the location of the component is not limited by the term.

Figure 2:
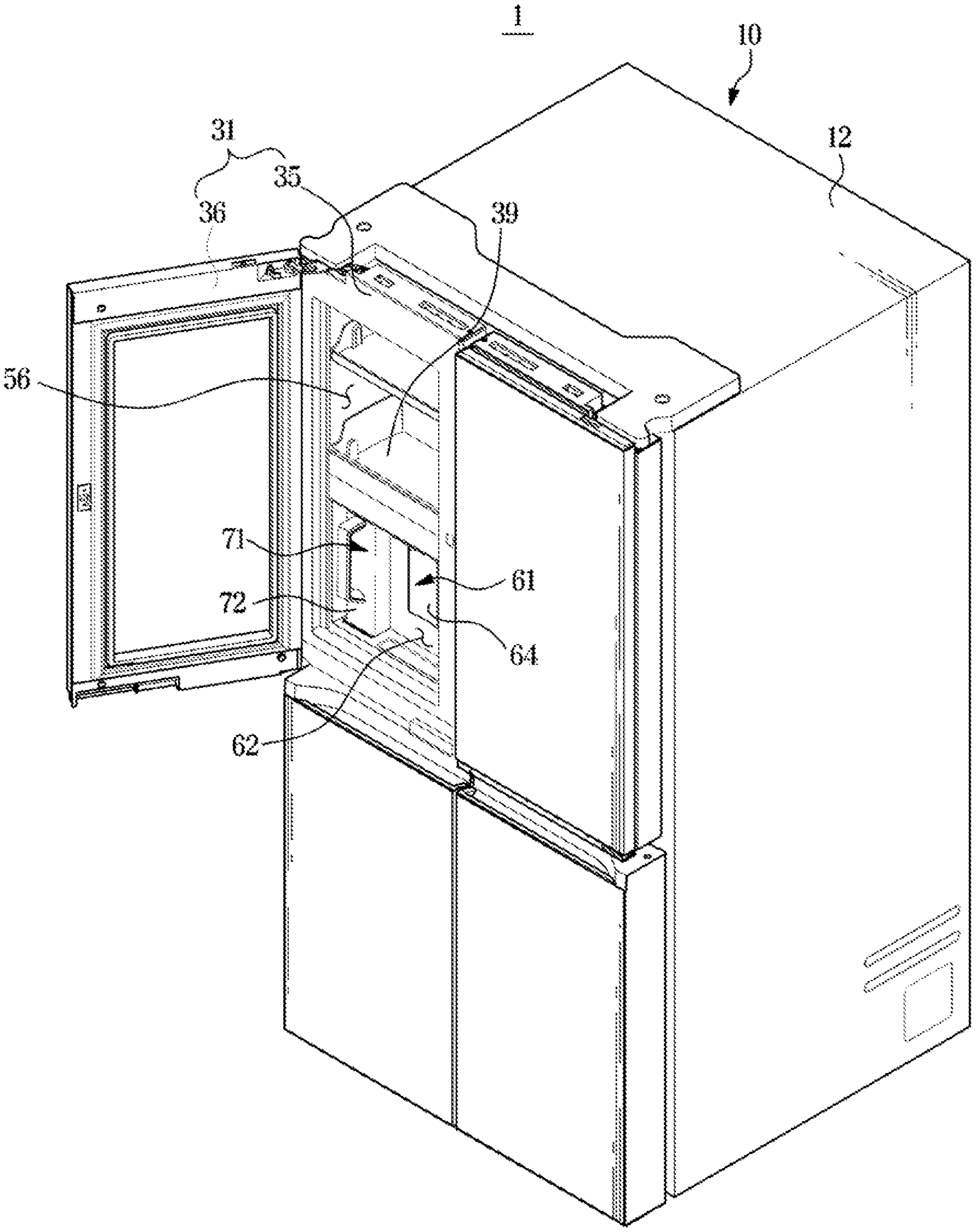
FIG. 2 is a perspective view illustrating a state in which an outer door of the refrigerator according to an embodiment of the disclosure is opened.
Figure 3:
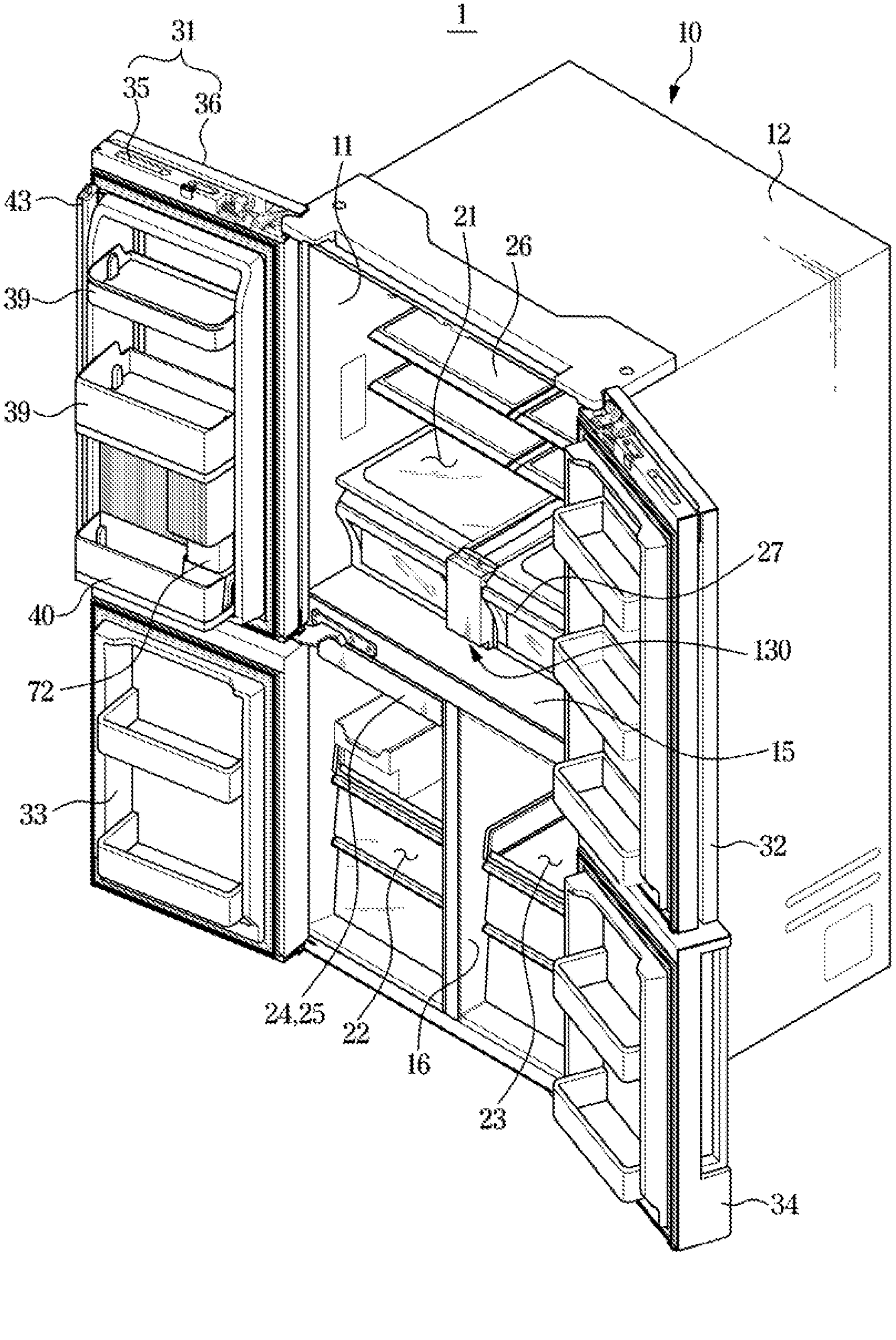
FIG. 3 is a perspective view illustrating a state in which an inner door of the refrigerator according to an embodiment of the disclosure is opened.
Figure 4:
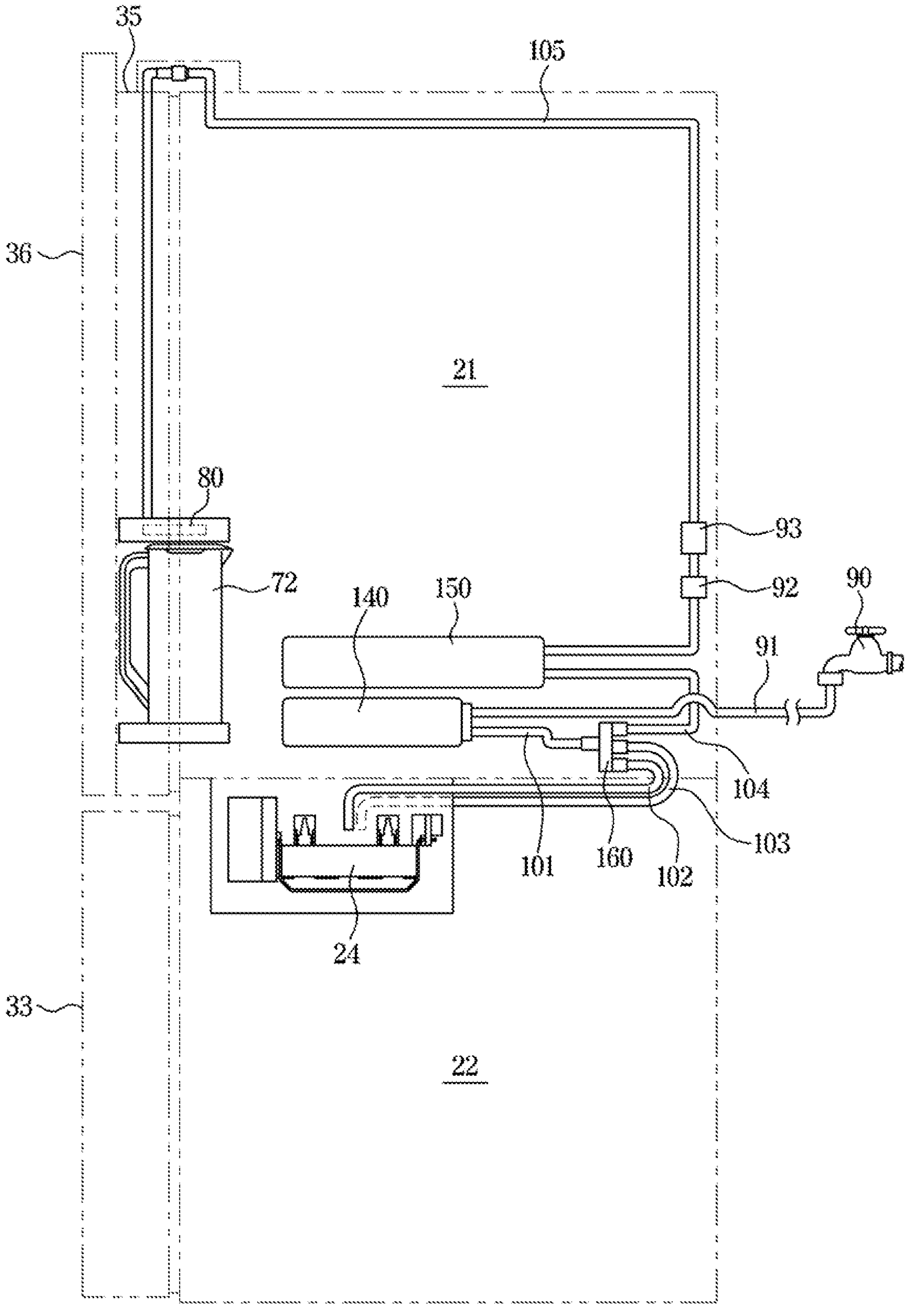
FIG. 4 is a schematic view illustrating a water supply flow path of the refrigerator according to an embodiment of the disclosure.
Figure 5:
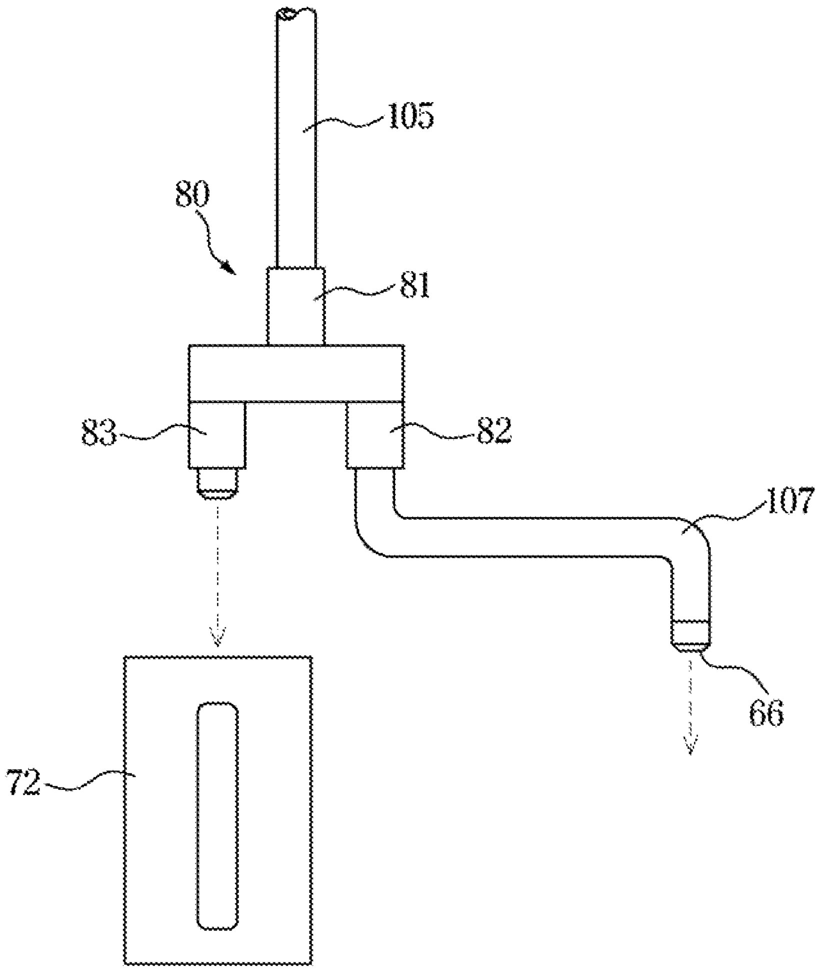
FIG. 5 is a schematic view illustrating a portion of the water supply flow path of the refrigerator according to an embodiment of the disclosure.
Figure 6:
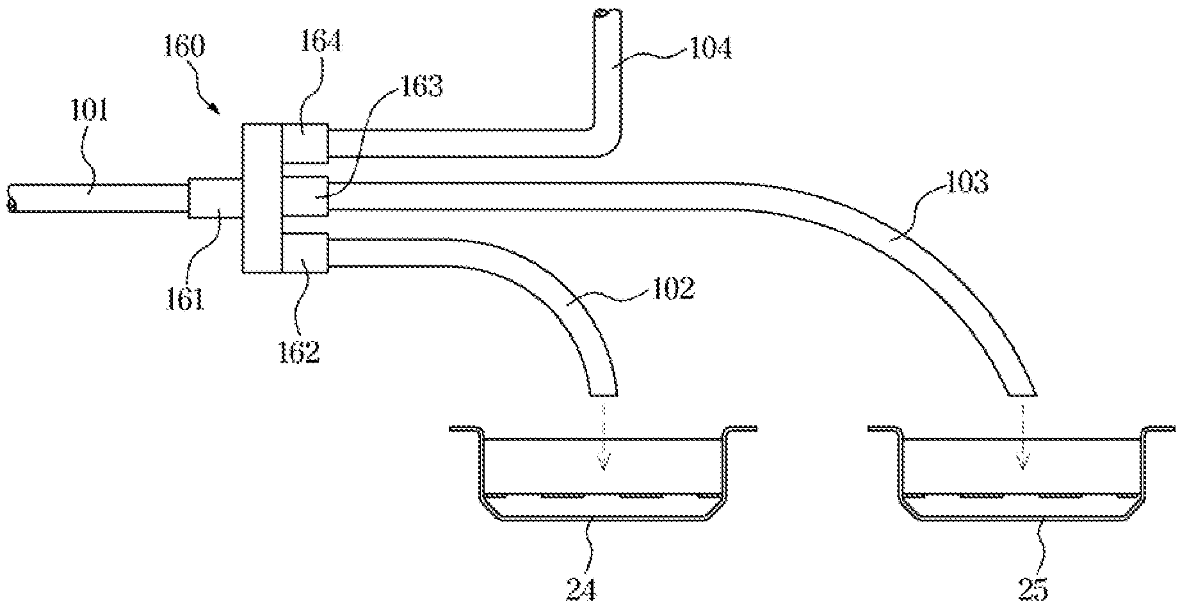
FIG. 6 is a schematic view illustrating a portion of the water supply flow path of the refrigerator according to an embodiment of the disclosure.

The disclosure will be described more fully hereinafter with reference to the accompanying drawings FIG. 1 is a perspective view illustrating an exterior of a refrigerator according to an embodiment of the disclosure. FIG. 2 is a perspective view illustrating a state in which an outer door of the refrigerator according to an embodiment of the disclosure is opened. FIG. 3 is a perspective view illustrating a state in which an inner door of the refrigerator according to an embodiment of the disclosure is opened. FIG. 4 is a schematic view illustrating a water supply flow path of the refrigerator according to an embodiment of the disclosure. FIG. 5 is a schematic view illustrating a portion of the water supply flow path of the refrigerator according to an embodiment of the disclosure. FIG. 6 is a schematic view illustrating a portion of the water supply flow path of the refrigerator according to an embodiment of the disclosure.

Referring to FIGS. 1 to 4, a refrigerator 1 according to an embodiment of the disclosure may include a body 10, storage compartments 21, 22, and 23 formed inside the body 10, doors 31, 32, 33, and 34 configured to open and close the storage compartments 21, 22, and 23, and a cold air supply device (not shown) configured to supply cold air to the storage compartments 21, 22 and 23.

The body 10 may include an inner case 11 forming the storage compartments 21, 22, and 23, an outer case 12 coupled to an outside of the inner case 11 to form an exterior, and an insulating material (not shown) provided between the inner case 11 and the outer case 12 to insulate the storage compartments 21, 22, and 23.

The storage compartments 21, 22, and 23 may be divided into a plurality of spaces by a horizontal partition wall 15 and a vertical partition wall 16. The storage compartments 21, 22, 23 may be divided into an upper storage compartment 21 and a lower storage compartment 22 and 23 by the horizontal partition wall 15, and the lower storage compartments 22 and 23 may be divided into a left lower storage compartment 22 and a right lower storage compartment 23 by the vertical partition wall 16.

The upper storage compartment 21 may be used as a refrigerating compartment, and the lower storage compartments 22 and 23 may be used as a freezing compartment. However, the division and use of the storage compartments 21, 22, and 23 as described above is only one example, and is not limited thereto.

Hereinafter the upper storage compartment 21 is referred to as a refrigerating compartment, and the lower storage compartments 22 and 23 are referred to as a freezing compartment.

In addition, unlike the embodiment, the refrigerator may be a side by side (SBS) type in which the storage compartment is divided into left and right sides by a vertical partition wall, and a French Door Refrigerator (FDR) type in which the storage compartment is divided into an upper refrigerating compartment and a lower freezing compartment by a horizontal partition wall.

A shelf 26 provided to place food, and a storage container 27 provided to store food may be provided in the storage compartments 21, 22, and 23.

The cold air supply device may generate cold air using a cooling cycle of compressing, condensing, expanding, and evaporating the refrigerant, and supplying the generated cold air to the storage compartments 21, 22, and 23.

The refrigerating compartment 21 may be opened and closed by a pair of doors 31 and 32. The doors 31 and 32 may be rotatably coupled to the body 10. In any one door 31 of the pair of doors 31 and 32, a filler 43 may be provided to prevent the cold air of the refrigerating compartment 21 from flowing between the pair of doors 31 and 32 upon closing the pair of doors 31 and 32.

The left freezing compartment 22 may be opened and closed by a door 33, and the door 33 may be rotatably coupled to the body 10. The right freezing compartment 23 may be opened and closed by a door 34, and the door 34 may be rotatably coupled to the body 10.

The doors 31, 32, 33, and 34 may include door baskets 39, and 40 including a door storage space provided to store food. A gasket in close contact with a front surface of the body 10 may be provided on rear surfaces of the doors 31, 32, 33, and 34 to seal the storage compartments 21, 22, and 23.

At least one of the doors 31, 32, 33, and 34 may be provided as a double door including an inner door 35 and an outer door 36. For example, the upper left door 31 may include the inner door 35 and the outer door 36.

The inner door 35 may be rotatably coupled to the body 10 through a hinge. The inner door 35 may include a door inner space 56. The door inner space 56 may be formed in a central portion except for an edge portion of the inner door 35. The door inner space 56 may be formed to extend between the front and rear surfaces of the inner door 35. Accordingly, in response to the inner door 35 being closed, the door inner space 56 may communicate with the refrigerating compartment 21.

Door baskets 39 and 40 may be mounted in the door inner space 56.

Figure 7:
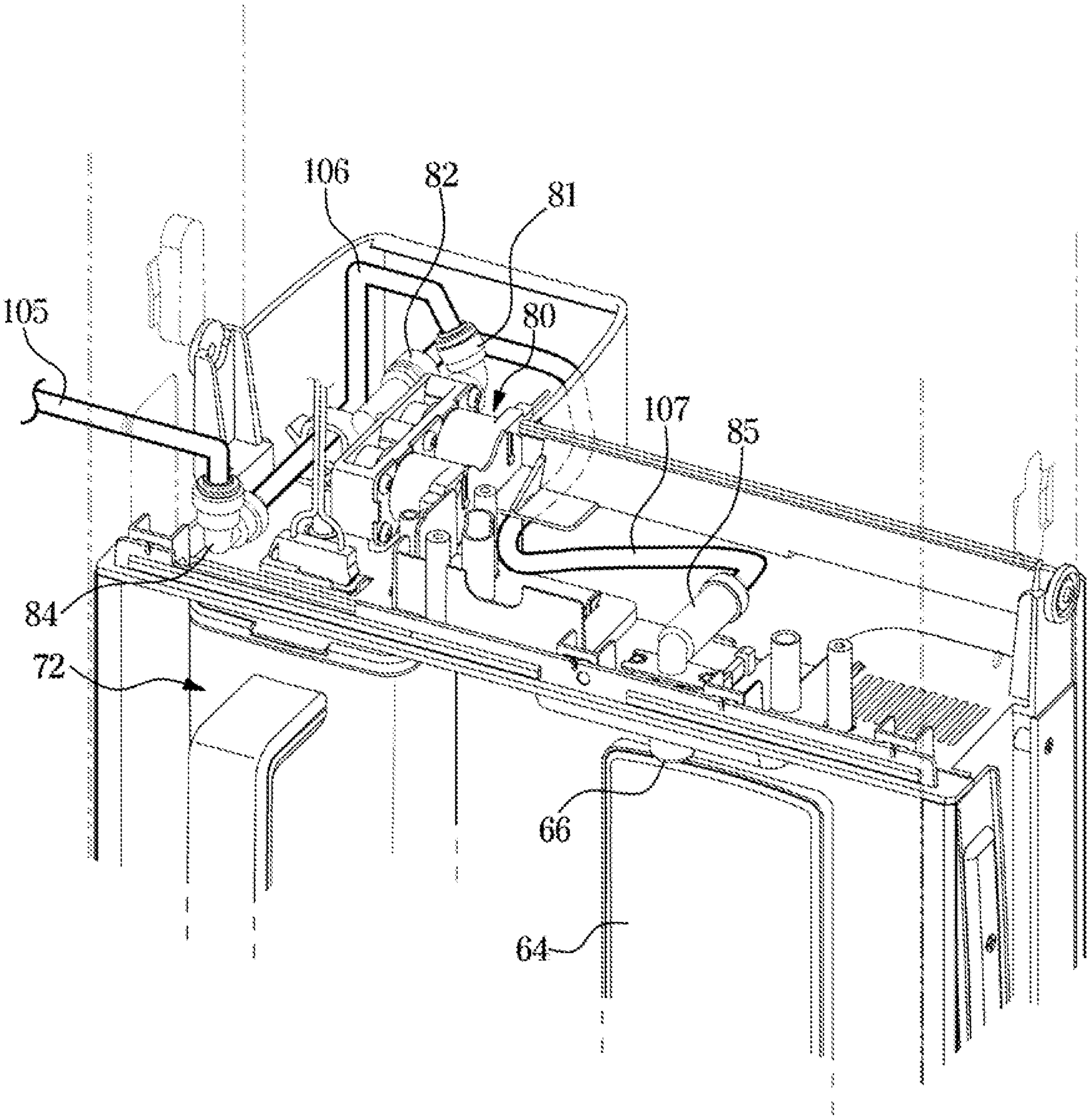
FIG. 7 is a view illustrating a structure of the water supply flow path arranged on the inner door of the refrigerator according to an embodiment of the disclosure.

A dispenser 61 may be provided in the door inner space 56. The dispenser 61 may include an operating lever 64 provided to receive water by operating the dispenser 61. A user may press the operating lever 64 using a container (not shown) such as a cup. The dispenser 61 may include a water intake space 62 in which a container is arranged to receive water discharged from a dispenser nozzle 66 (FIG. 7).

In the door inner space 56, a water container mounting space in which a water container 72 is mounted, and an automatic water supply device 71 including a water level sensor (not shown) configured to detect a water level of the water container 72 in response to the water container 72 being mounted in the water container mounting space may be provided. The automatic water supply device 71 may include an outlet provided to supply water to the water container 72 mounted in the water container mounting space.

The automatic water supply device 71 may automatically supply water to the water container 72 to fill a predetermined amount of water in the water container 72 in response to the water container 72 being mounted in the water container mounting space. That is, the automatic water supply device 72 may perform an auto-fill function. The predetermined amount may be approximately the full amount of the water container 72.

The dispenser 61 and the automatic water supply device 71 may be provided in the inner door 35 to allow a user to access the dispenser 61 and the automatic water supply device 71 in a state in which the outer door 36 is opened and the inner door 35 is closed.

According to an embodiment of the disclosure, a water purifier 130 may be arranged in the refrigerating compartment 21. The water purifier 130 may purify and store water supplied from an external water supply source 90. The water purifier 130 may include a water filter 140 configured to purify water supplied from the external water supply source 90, and a water tank 150 provided to store water purified through the water filter 140.

The water purifier 130 may be arranged on one side of the refrigerating compartment 21. For example, as illustrated in FIG. 3, the water purifier 130 may be arranged between a pair of storage containers 27 arranged side by side in the refrigerating compartment 21. However, the location of the water purifier 130 is not limited thereto. The water purifier 130 may be arranged at an appropriate position in the refrigerating compartment 21.

Ice makers 24 and 25 may be arranged in the freezing compartment 22 of the refrigerator 1. The ice makers 24 and 25 may generate ice using cold air in the freezing compartment 22.

According to an embodiment of the disclosure, the ice makers 24 and 25 may be arranged in the left freezing compartment 22. More particularly, the ice makers 24 and 25 may be arranged on the upper left side of the left freezing compartment 22. However, the disclosure is not limited thereto, and the ice makers 24 and 25 may be arranged in the right freezing compartment 23.

According to an embodiment of the disclosure, the refrigerator 1 may include the pair of ice makers 24 and 25. The pair of ice makers 24 and 25 may include a first ice maker 24 and a second ice maker 25. The first ice maker 24 and the second ice maker 25 may be arranged side by side on the left and right.

The first ice maker 24 and the second ice maker 25 may be configured to generate different types of ice. Accordingly, a user may select a desired type of ice from any one of the first ice maker 24 and the second ice maker 25.

In addition, because the ice makers 24 and 25 are provided in plural, an amount of ice generated by the ice makers 24 and 25 may increase. A user may take out a relatively sufficient amount of ice compared to a refrigerator including a single ice maker.

Referring to FIGS. 4 to 6, the refrigerator 1 according to an embodiment of the disclosure may include water supply flow paths 91, 101, 102, 103, 104, and 105 provided to supply water to the dispenser 61, the automatic water supply device 71, and the ice makers 24 and 25 from the external water supply source 90.

The water supply flow paths 91, 101, 102, 103, 104, and 105 may include a first water supply flow paths 91, 101, 102, and 103 provided to connect the external water supply source 90 to the ice makers 24 and 25 to supply water to the ice makers 24 and 25, and second water supply flow paths 91, 101, 104, and 105 provided to connect the external water supply source 90 to a second control valve 80 to supply water to the dispenser 61 and the automatic water supply device 71.

The first water supply flow paths 91, 101, 102, and 91, 101, 103 and the second water supply flow paths 91, 101, 104, and 105 may be formed to diverge at one point on the water supply flow path. A first control valve 160 may be provided at a branch point where the first water supply flow paths 91, 101, 102, and 91, 101, 103 and the second water supply flow paths 91, 101, 104, and 105 diverge. Water from the external water supply source 90 may be supplied to the ice makers 24 and 25 or the second control valve 80 according to the control of the first control valve 160 and a water pressure of the external water supply source 90.

The first water supply flow paths 91, 101, 102, and 91, 101, 103 may include a first ice maker flow path 102 provided to connect the external water supply source 90 to the first ice maker 24, and a second ice maker flow path 103 provided to connect the external water supply source 90 to the second ice maker 25.

The first water supply flow paths 91, 101, 102, and 91, 101, 103 may be provided to pass through the water filter 140. Water from the external water supply source 90 may be purified through the water filter 140 and supplied to the first control valve 160.

The first control valve 160 may guide the water supplied from the external water supply source 90 to the first ice maker 24, the second ice maker 25, or the water tank 150. The first control valve 160 may have the same shape as a four-way valve. Particularly, the first control valve 160 may include a first inlet port 161, a first outlet port 162 provided to supply water to the first ice maker 24, a second outlet port 163 provided to supply water to the second ice maker 25, and a third outlet port 164 provided to supply water to the water tank 150. The first control valve 160 may selectively open and close any one or two or more of the first outlet port 162, the second outlet port 163, and the third outlet port 164. Accordingly, the first control valve 160 may supply water, which is supplied to the first inlet port 161, to any one or two or more of the first outlet port 162, the second outlet port 163, and the third outlet port 164.

The first ice maker flow path 102 may guide water, which is supplied from the external water supply source 90, to the first ice maker 24 through the water filter 140 and the first control valve 160. The second ice maker flow path 103 may guide water, which is supplied from the external water supply source 90, to the second ice maker 25 through the water filter 140 and the first control valve 160.

Even when water supplied to the ice makers 24 and 25 is not cooled in the water tank 150, the water is cooled by the cold air inside the freezing compartment 22. Accordingly, the first water supply flow paths 91, 101, 102, and 91, 101, 103 may not pass through the water tank 150 unlike the second water supply flow paths 91, 101, 104, and 105 described later.

The second water supply flow paths 91, 101, 104, and 105 may be provided to pass through the water filter 140, like the first water supply flow paths 91, 101, 102, and 91, 101, 103. Water from the external water supply source 90 may be purified through the water filter 140 and supplied to the first control valve 160. The water supplied to the first control valve 160 may be supplied to the water tank 150 through the third outlet port 164. The second water supply flow paths 91, 101, 104, and 105 may be provided to pass through the water tank 150.

The second water supply flow paths 91, 101, 104, and 105 may guide the water, which is supplied from the external water supply source 90, to the second control valve 80 through the water filter 140, the first control valve 160, and the water tank 150. The second control valve 80 may guide the water, which is supplied from the external water supply source 90, to the water intake space 62 or the water container 72. The second control valve 80 may have the same shape as a three-way valve. Particularly, the second control valve 80 may include a second inlet port 81 connected to the second water supply flow paths 91, 101, 104, 105 to receive water from the external water supply source 90, a fourth outlet port 82 provided to supply water to the water intake space 62, and a fifth outlet port 83 provided to supply water to the water container 72. The fourth outlet port 82 and the fifth outlet port 83 may be selectively opened and closed.

According to an embodiment of the disclosure, a water valve 92 may be provided in the second water supply flow paths 91, 101, 104, and 105. The water valve 92 may control an amount of water supplied from the water tank 150 to the second control valve 80. A flow sensor 93 may be provided in the second water supply flow paths 91, 101, 104, and 105. The flow sensor 93 may measure the amount of water supplied to the second control valve 80.

FIG. 7 is a view illustrating a structure of the water supply flow path arranged in the inner door of the refrigerator according to an embodiment of the disclosure.

Referring to FIG. 7, the water supply flow path 105 may be connected to one end of a first fitting member 84. The other end of the first fitting member 84 and the second inlet port 81 of the second control valve 80 may be connected by a first connection flow path 106. Alternatively, the first fitting member 84 may be omitted, and the water supply flow path 105 may be directly connected to the second inlet port 81 of the second control valve 80.

The fourth outlet port 82 of the second control valve 80 may be connected to one end of a second fitting member 85 through a second connection flow path 107. The dispenser nozzle 66 may be coupled to the other end of the second fitting member 85. The dispenser nozzle 66 may be detachably coupled to the other end of the second fitting member 85.

The fifth outlet port 83 may be formed to protrude to a lower side of the second control valve 80. Water discharged from the fifth outlet port 83 may fall in the direction of gravity and directly flow into an inlet of the water container 72 without a separate connection member (FIG. 5). The fifth outlet port 83 may be referred to as an outlet of the automatic water supply device 71.

Figure 8:
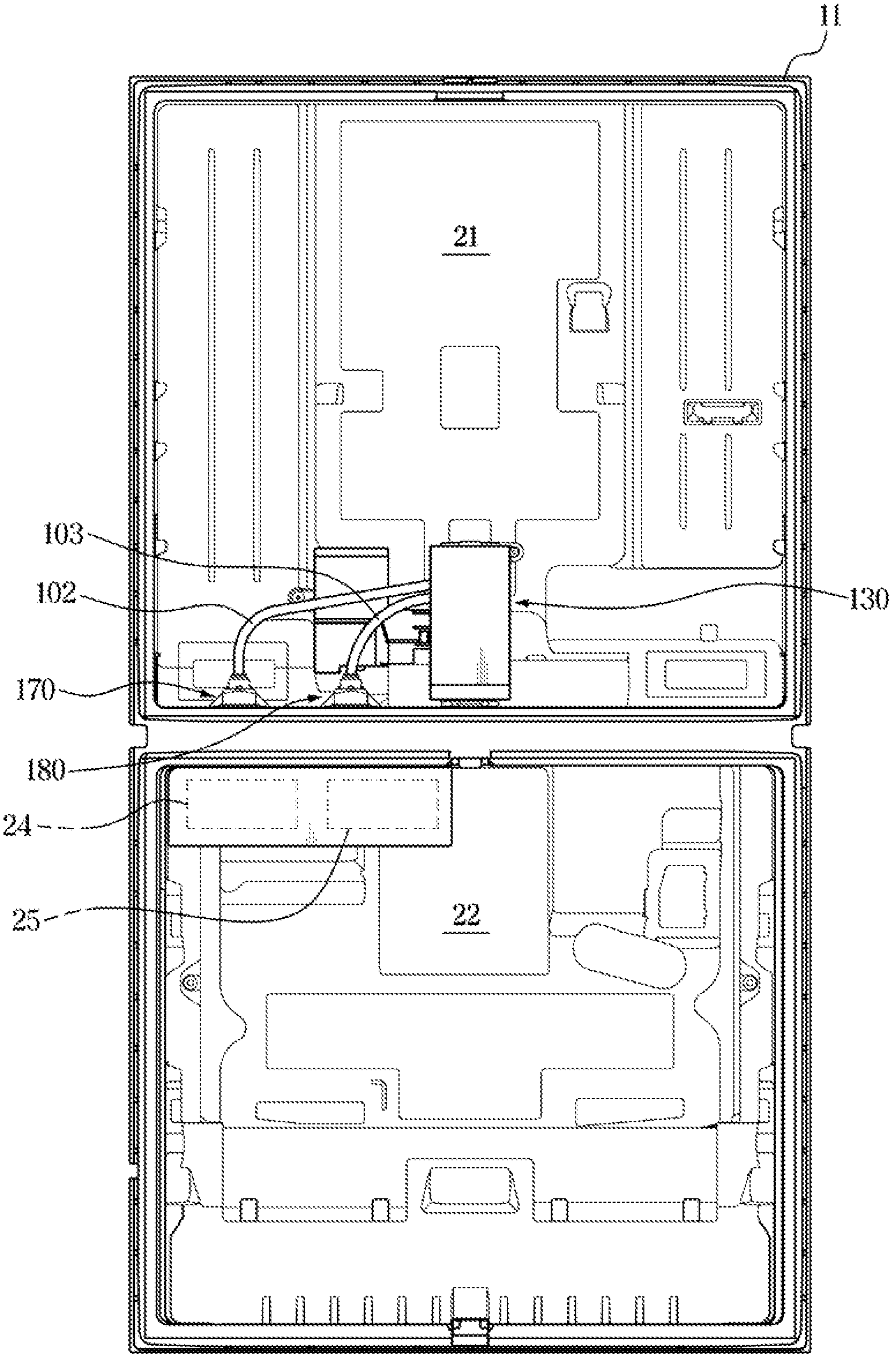
FIG. 8 is a view illustrating an inner case, and a water purifier, an ice maker and a water supply flow path structure arranged on the inner case of the refrigerator according to an embodiment of the disclosure.
Figure 9:
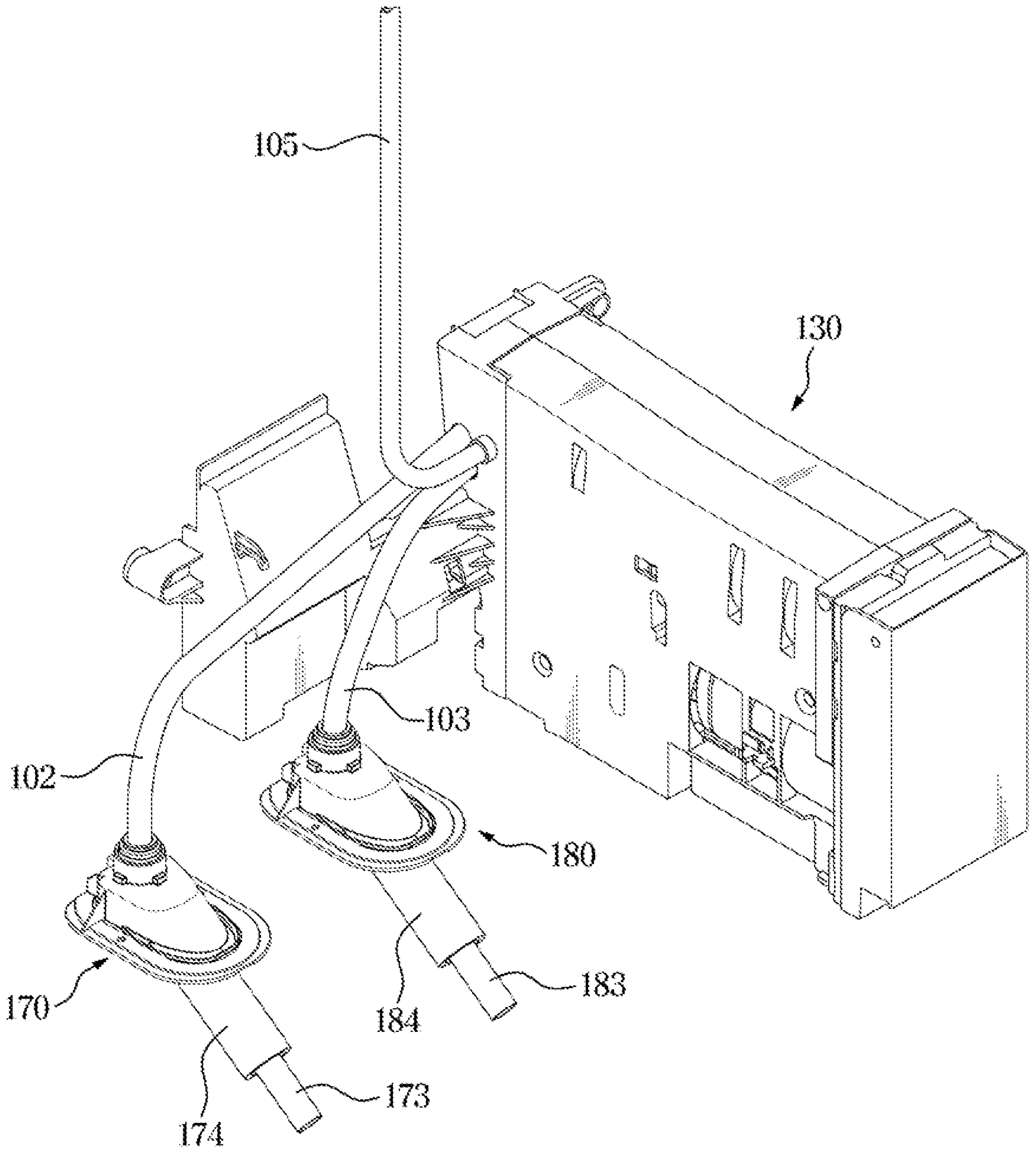
FIG. 9 is a view illustrating the water purifier and the water supply flow path structure illustrated in FIG. 8.
Figure 10:
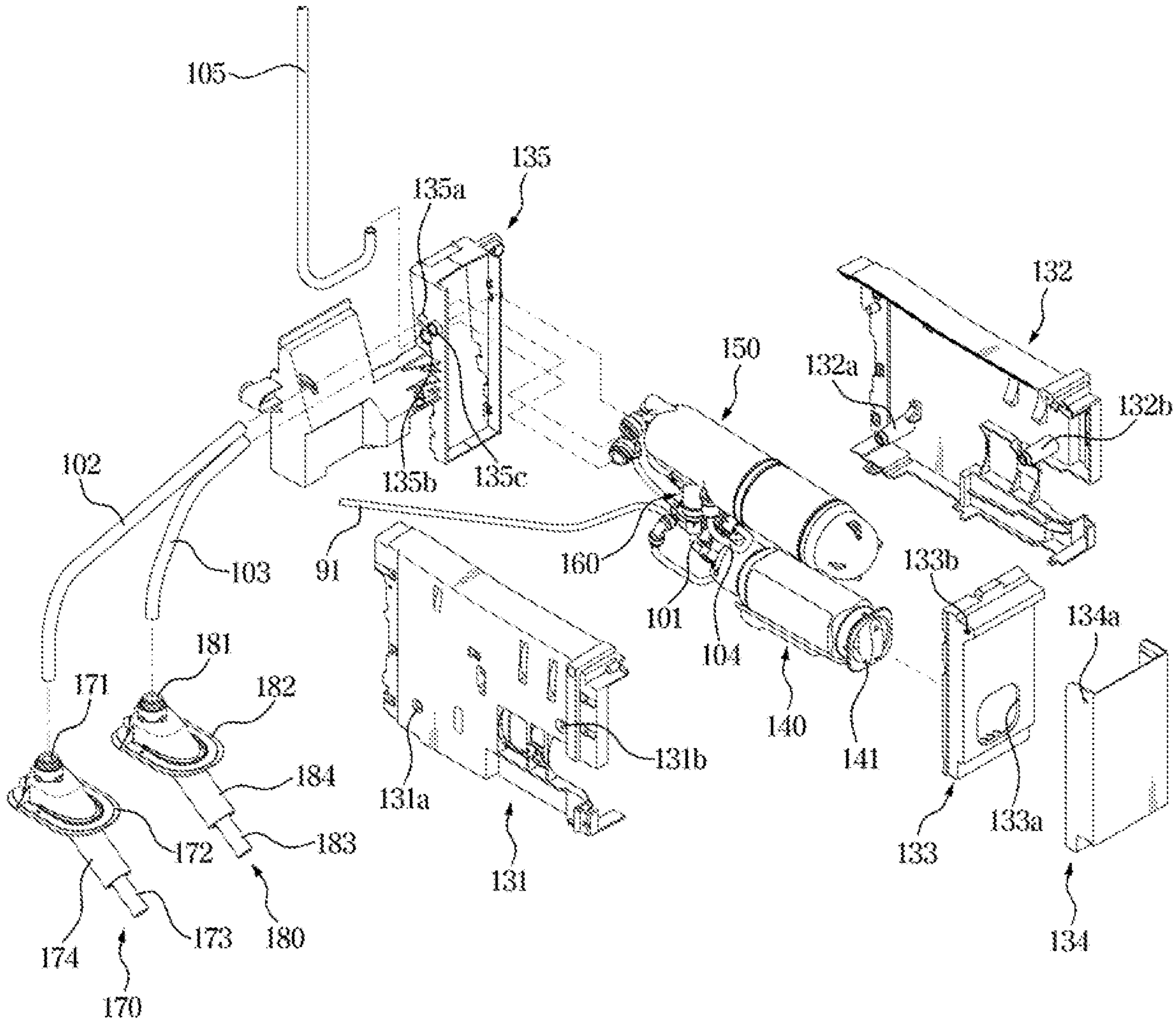
FIG. 10 is an exploded view illustrating the water purifier and the water supply flow path structure illustrated in FIG. 9.
Figure 11:
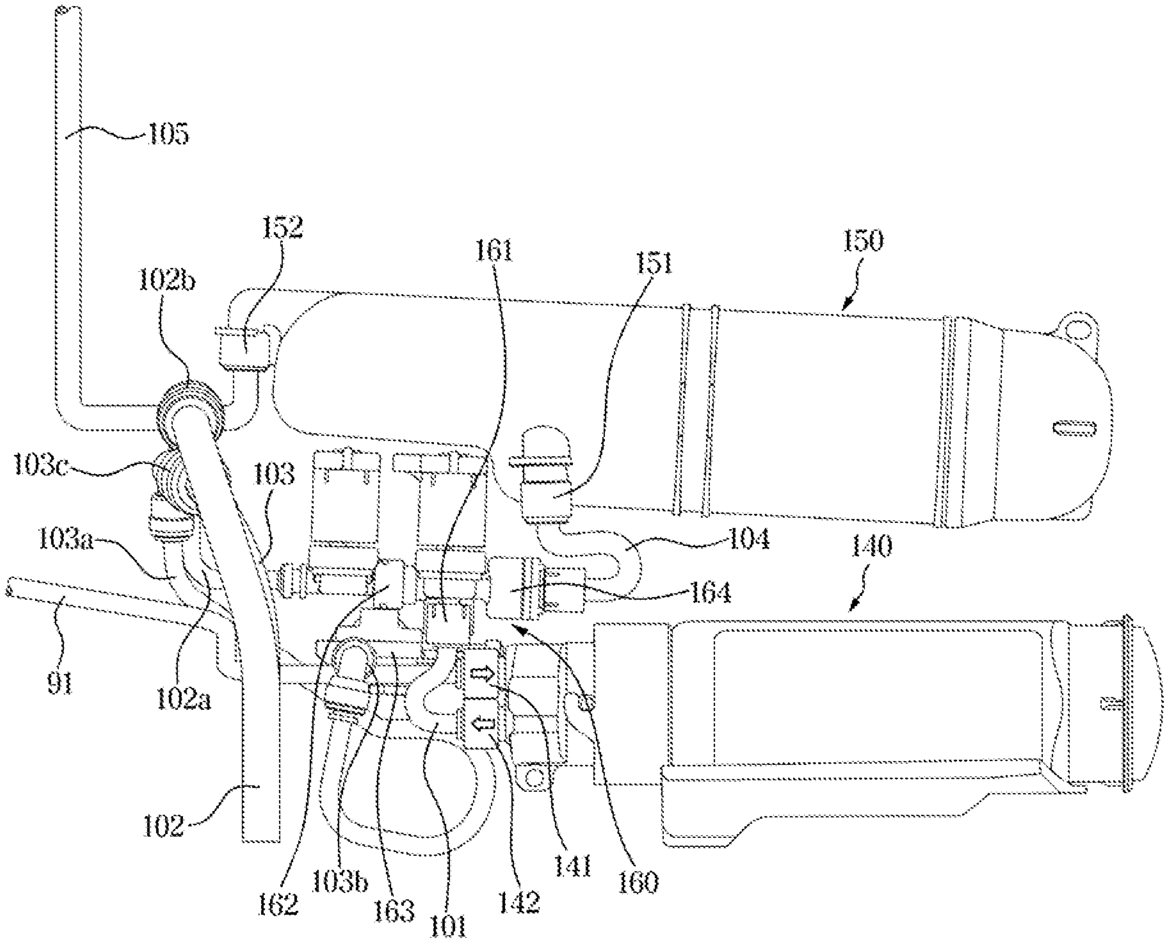
FIG. 11 is a view illustrating a water filter, a water tank, and the water supply flow path structure illustrated in FIG. 10.
Figure 12:
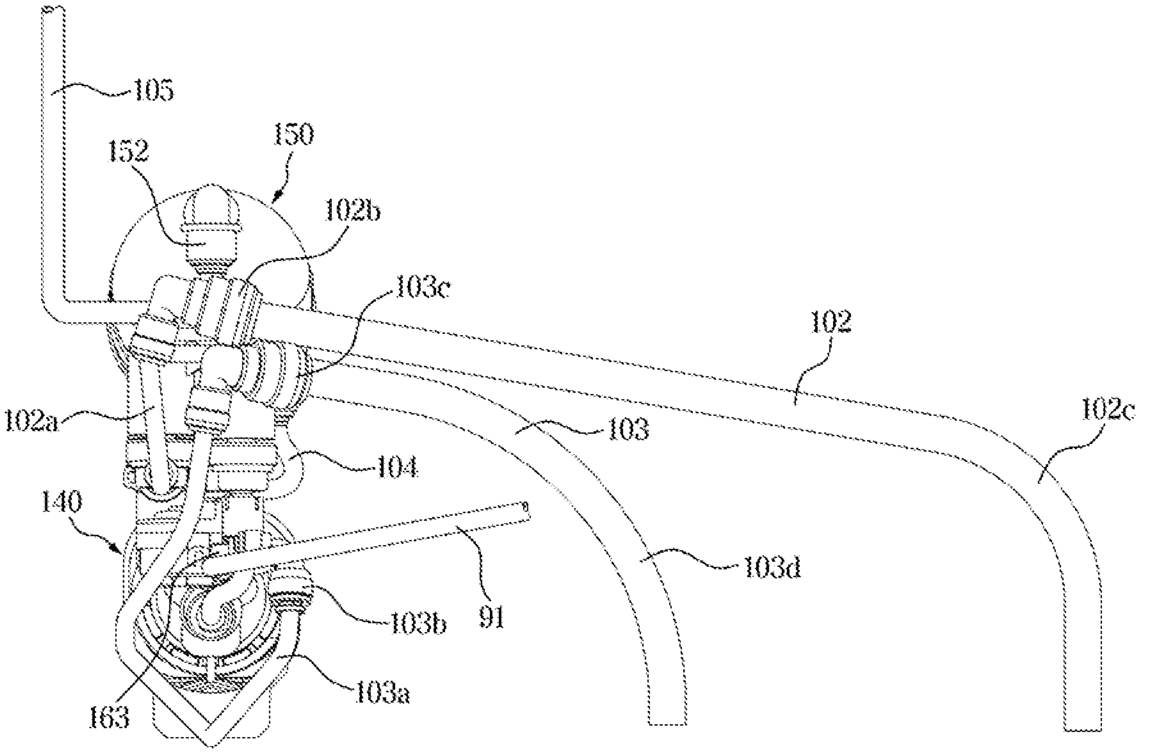
FIG. 12 is a view illustrating the water filter, the water tank, and the water supply flow path structure illustrated in FIG. 11 when viewed from different angles.

FIG. 8 is a view illustrating an inner case, and a water purifier, an ice maker and a water supply flow path structure arranged on the inner case of the refrigerator according to an embodiment of the disclosure. FIG. 9 is a view illustrating the water purifier and the water supply flow path structure illustrated in FIG. 8. FIG. 10 is an exploded view illustrating the water purifier and the water supply flow path structure illustrated in FIG. 9. FIG. 11 is a view illustrating a water filter, a water tank, and the water supply flow path structure illustrated in FIG. 10. FIG. 12 is a view illustrating the water filter, the water tank, and the water supply flow path structure illustrated in FIG. 11 when viewed from different angles.

As illustrated in FIG. 8, the water purifier 130 may be arranged in the refrigerating compartment 21 to purify and store water supplied from the external water supply source 90. Water purified through the water filter 140 may be supplied to the ice makers 24 and 25 arranged in the freezing compartment 22 along the water supply flow paths 102 and 103. In this case, the water purified by the water filter 140 may be supplied to the ice makers 24 and 25 by penetrating the horizontal partition wall 15 provided to define the refrigerating compartment 21 and the freezing compartment 22.

Conventionally, water is supplied to the ice maker by penetrating the rear wall of the refrigerating compartment and the freezing compartment without directly penetrating the partition wall provided to define the refrigerating compartment and the freezing compartment. That is, the water supply flow path penetrates the rear wall of the refrigerating compartment and passes between the inner case and the outer case, and then penetrates the rear wall of the freezing compartment again, thereby supplying water to the ice maker.

On the other hand, according to the disclosure, because the water supply flow path directly supplies water, which is purified in the refrigerating compartment 21, to the ice makers 24 and 25 by penetrating the horizontal partition wall 15, it is possible to simplify and reduce the water supply flow path in comparison with the conventional method. Accordingly, the assembly and productivity of the refrigerator 1 may be improved.

Hereinafter the water supply flow paths 91, 101, 102, 103, 104, and 105 represent actual components rather than a conceptual flow path, and their names will be described later.

Referring to FIG. 9, water passing through the water purifier 130 may be supplied to the first ice maker 24 through the first connection hose 102 and the first water supply device 170, and may be supplied to the second ice maker 25 through the second connection hose 103 and the second water supply device 180.

A detailed configuration of the water purifier 130 and the water supply devices 170 and 180 will be described with reference to FIG. 10.

The water purifier 130 may include cases 131, 132, 133, 134, and 135 provided to accommodate the water filter 140 and the water tank 150 therein.

The cases 131, 132, 133, 134, and 135 may include a first case 131 including a first coupling hole **131*a* and a second coupling hole 131*b*, and a second case 132 including a first coupling protrusion 132*a* corresponding to the first coupling hole 131*a* and a second coupling protrusion 132*b* corresponding to the second coupling hole 131*b*. The water filter 140 and the water tank 150 may be accommodated in an accommodating space formed by coupling the first case 131 to the second case 132**.

A third case 133 may be provided to cover front surfaces of the water filter 140 and the water tank 150. The third case 133 may include a hole **133*a* through which a handle 141 of the water filter 140 passes, and a protrusion 133*b* provided to be inserted into a hinge hole 134*a* of a case cover 134. As the protrusion 133*b* of the third case 133 is inserted into the hinge hole 134*a* of the case cover 134, the case cover 134 may be hinge-coupled to the third case 133**.

A fourth case 135 may be provided to cover rear surfaces of the water filter 140 and the water tank 150. The fourth case 135 may include a first hole **135*a* into which the first connection hose 102 is inserted, a second hole 135*b* into which the second connection hose 103 is inserted, and a third hole 135*c* into which the water supply flow path 105** is inserted.

The first control valve 160 provided to supply water purified from the water filter 140 to the ice makers 24 and 25 or the second control valve 80 may be arranged between the water filter 140 and the water tank 150.

The first water supply device 170 may include a first hose insertion portion 171 into which one end of the first connection hose 102 is inserted. The first hose insertion portion 171 may be provided to allow the first connection hose 102 formed of a flexible material to be inserted-coupled thereto without a separate member.

The first water supply device 170 may include a first flange portion 172 provided to cover a water supply hole (not shown) formed on a lower surface of the refrigerating compartment 21. The first flange portion 172 may cover the water supply hole, which is formed by penetrating the lower surface of the refrigerating compartment 21, so as to prevent the cold air inside the refrigerating compartment 21 from flowing out through the water supply hole. In addition, the first flange portion 172 may prevent the cold air inside the freezing compartment 22 from flowing into the refrigerating compartment 21 through the water supply hole.

The first water supply device 170 may include a first water supply pipe 173 provided to guide water of the first connection hose 102 to the first ice maker 24. The first water supply pipe 173 may be formed of a metal material such as an aluminum material. A first heat insulating portion 174 may be provided to cover at least a portion of the first water supply pipe 173. In addition, although not particularly illustrated in the drawings, the first water supply pipe 173 may include a heater (not shown). Accordingly, it is possible to prevent the water inside the first water supply pipe 173 from freezing and blocking the first water supply pipe 173.

The second water supply device 180 may include a second hose insertion portion 181 into which one end of the second connection hose 103 is inserted. The second hose insertion portion 181 may be provided to allow the second connection hose 103 formed of a flexible material to be inserted-coupled thereto without a separate member.

The second water supply device 180 may include a second flange portion 182 provided to cover a water supply hole (not shown) formed on a lower surface of the refrigerating compartment 21. The second flange portion 182 may cover the water supply hole, which is formed by penetrating the lower surface of the refrigerating compartment 21, so as to prevent the cold air inside the refrigerating compartment 21 from flowing out through the water supply hole. In addition, the second flange portion 182 may prevent the cold air inside the freezing compartment 22 from flowing into the refrigerating compartment 21 through the water supply hole.

The second water supply device 180 may include a second water supply pipe 183 provided to guide water of the second connection hose 103 to the second ice maker 25. The second water supply pipe 183 may be formed of a metal material, such as an aluminum material. A second heat insulating portion 184 may be provided to cover at least a portion of the second water supply pipe 183. In addition, although not particularly illustrated in the drawings, the second water supply pipe 183 may include a heater (not shown). Accordingly, it is possible to prevent the water inside the second water supply pipe 183 from freezing and blocking the second water supply pipe 183.

The first control valve 160 and the flow path connected to the first control valve 160 according to an embodiment of the disclosure will be described in detail with reference to FIGS. 10 and 11.

The water supply flow path 91 connected to the external water supply source 90 may supply water to the water filter 140 through an inlet 141 of the water filter 140. One end of the water supply flow path 91 may be connected to the external water supply source 90, and the other end of the water supply flow path 91 may be connected to the inlet 141 of the water filter 140.

A first connection pipe 101 may connect an outlet 142 of the water filter 140 to the first inlet port 161 of the first control valve 160. One end of the first connection pipe 101 may be connected to the outlet 142 of the water filter 140, and the other end of the first connection pipe 101 may be connected to the first inlet port 161.

A second connection pipe **102*a* may connect the first outlet port 162 to the third fitting member 102*b*. The second connection pipe 102*a* may be connected to one end of a third fitting member 102*b*, and the first connection hose 102 may be connected to the other end of the third fitting member 102***b*. The third fitting member 102*b* may be provided to connect the second connection pipe 102*a* to the first connection hose 102 having different diameters.

A fourth fitting member 103*b* may be coupled to the second outlet port 163. The second outlet port 163 of the first control valve 160 may be connected to one end of the fourth fitting member 103*b*, and the third connection pipe 103*a* may be connected to the other end of the fourth fitting member 103*b*.

The third connection pipe 103*a* may be connected to the other end of the fourth fitting member 103*b*. The third connection pipe 103*a* may be connected to one end of a fifth fitting member 103*c*. The second connection hose 103 may be coupled to the other end of the fifth fitting member 103*c*. The fifth fitting member 103*c* may be provided to connect the third connection pipe 103*a* to the second connection hose 103 having different diameters.

A fourth connection pipe 104 may connect the third outlet port 164 to an inlet 151 of the water tank 150.

A water supply flow path 105 may connect an outlet 152 of the water tank 150 to the second control valve 80.

Referring to FIG. 12, the first connection hose 102 may include a first bent portion 102*c*, and the second connection hose 103 may include a second bent portion 103*d*.

One end of the first connection hose 102 may be connected substantially horizontally to the other end of the third fitting member 102*b*, and the other end of the first connection hose 102 may be connected substantially vertically to the first water supply device 170. Therefore, at least a portion 102*c* of the first connection hose 102 may be bent substantially vertically.

One end of the second connection hose 103 may be connected substantially horizontally to the other end of the fifth fitting member 103*c*, and the other end of the second connection hose 103 may be connected substantially vertically to the second water supply device 180. Therefore, at least one portion 103*d* of the second connection hose 103 may be bent substantially vertically.

According to the disclosure, an inner diameter of the first connection hose 102 may be greater than an inner diameter of the second connection pipe 102*a*. An inner diameter of the second connection hose 103 may be greater than an inner diameter of the third connection pipe 103*a*.

Because the inner diameter of the first connection hose 102 and the inner diameter of the second connection hose 103 are greater than the inner diameters of the second connection pipe 102*a* and the third connection pipe 103*a*, respectively, residual water may not remain inside the first connection hose 102 and the second connection hose 103.

As described above, the first connection hose 102 may receive water from the second connection pipe 102*a*. In a state in which the inner diameter of the first connection hose 102 is less than the inner diameter of the second connection pipe 102*a*, even if the water supply from the second connection pipe 102*a* to the first connection hose 102 is stopped, water may remain inside the first connection hose 102. Therefore, in order to prevent this, the inner diameter of the first connection hose 102 may be greater than the inner diameter of the second connection pipe 102*a*. For the same reason, the inner diameter of the second connection hose 103 may be greater than the inner diameter of the third connection pipe 103*a*.

According to the disclosure, the other end of the third fitting member 102*b* connected to the first connection hose 102 may be positioned higher than the bent portion 102*c* of the first connection hose 102. In other words, the bent portion 102*c* of the first connection hose 102 may be positioned lower than the other end of the third fitting member 102*b*.

Because the bent portion 102*c* of the first connection hose 102 is positioned lower than the other end of the third fitting member 102*b*, and the bent portion 102*c* is provided to be convex upwards, residual water may not remain inside the first connection hose 102. In a state in which the bent portion 102*c* of the first connection hose 102 is positioned higher than the other end of the third fitting member 102*b* and the bent portion 102*c* is provided to be concave downward, when the water supply to the first connection hose 102 is stopped, residual water may remain inside the first connection hose 102. The residual water inside the first connection hose 102 may be frozen, and due to the residual water being frozen, the inside of the first connection hose 102 may be blocked. In the refrigerator 1 of the disclosure, the residual water may not remain inside the first connection hose 102 by the above-described structure, and it is possible to prevent the residual water from freezing.

For the same reason, the other end of the fifth fitting member 103*c* connected to the second connection hose 103 may be positioned higher than the bent portion 103*d* of the second connection hose 103.

Figure 13:
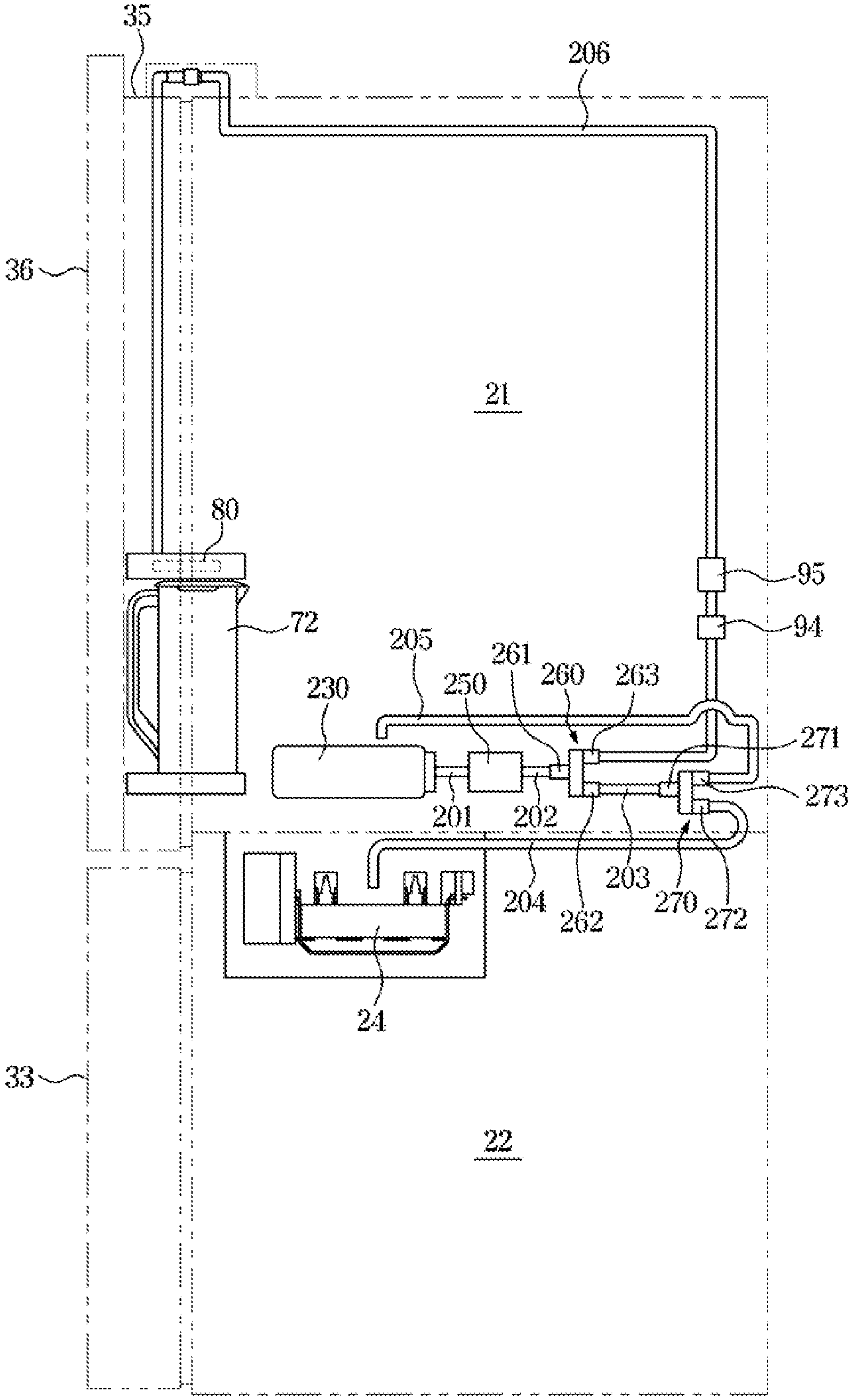
FIG. 13 is a schematic view illustrating a water supply flow path of a refrigerator according to another embodiment of the disclosure.
Figure 14:
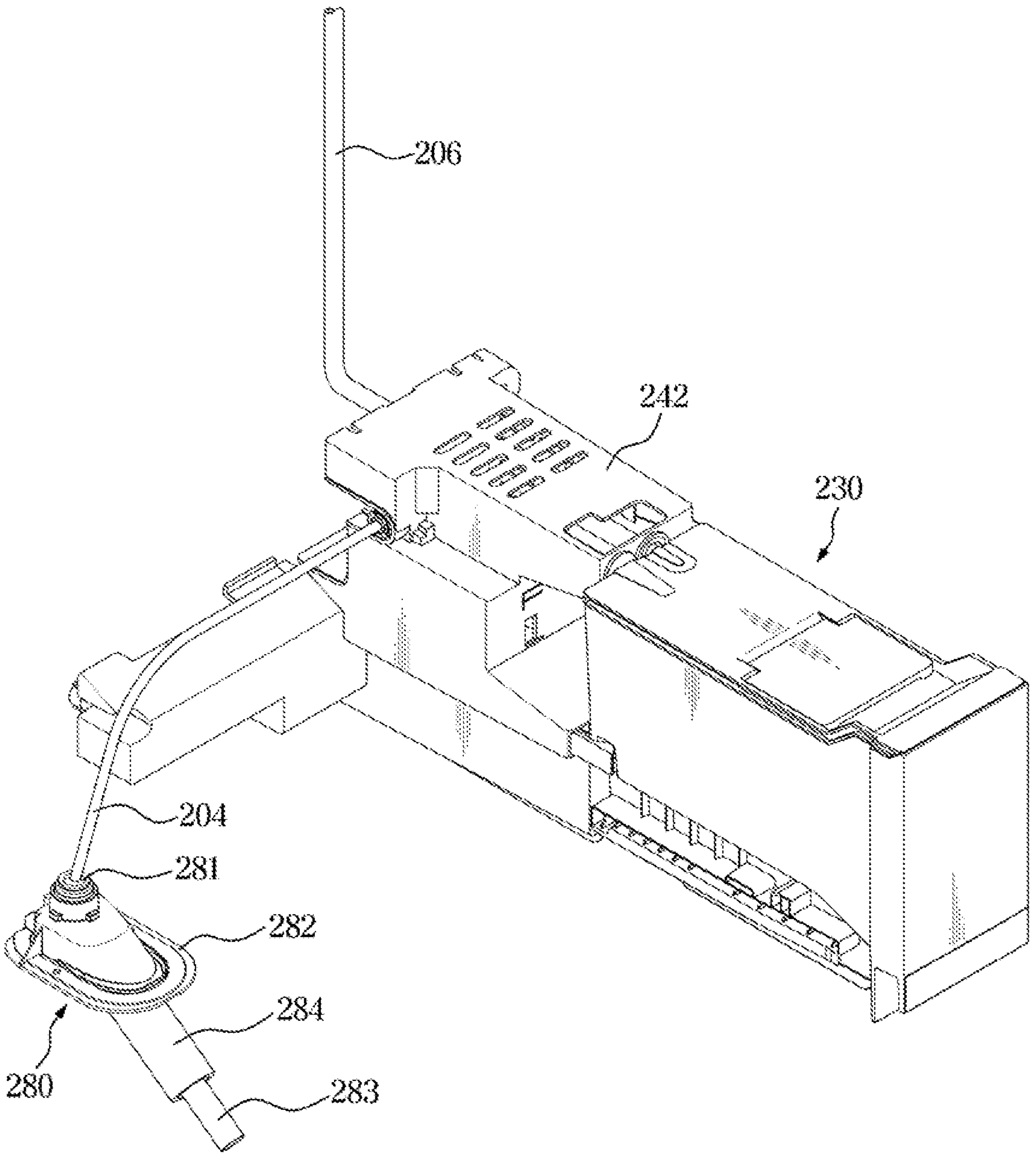
FIG. 14 is a view illustrating a water supply device and the water supply flow path structure of the refrigerator according to another embodiment of the disclosure.
Figure 15:
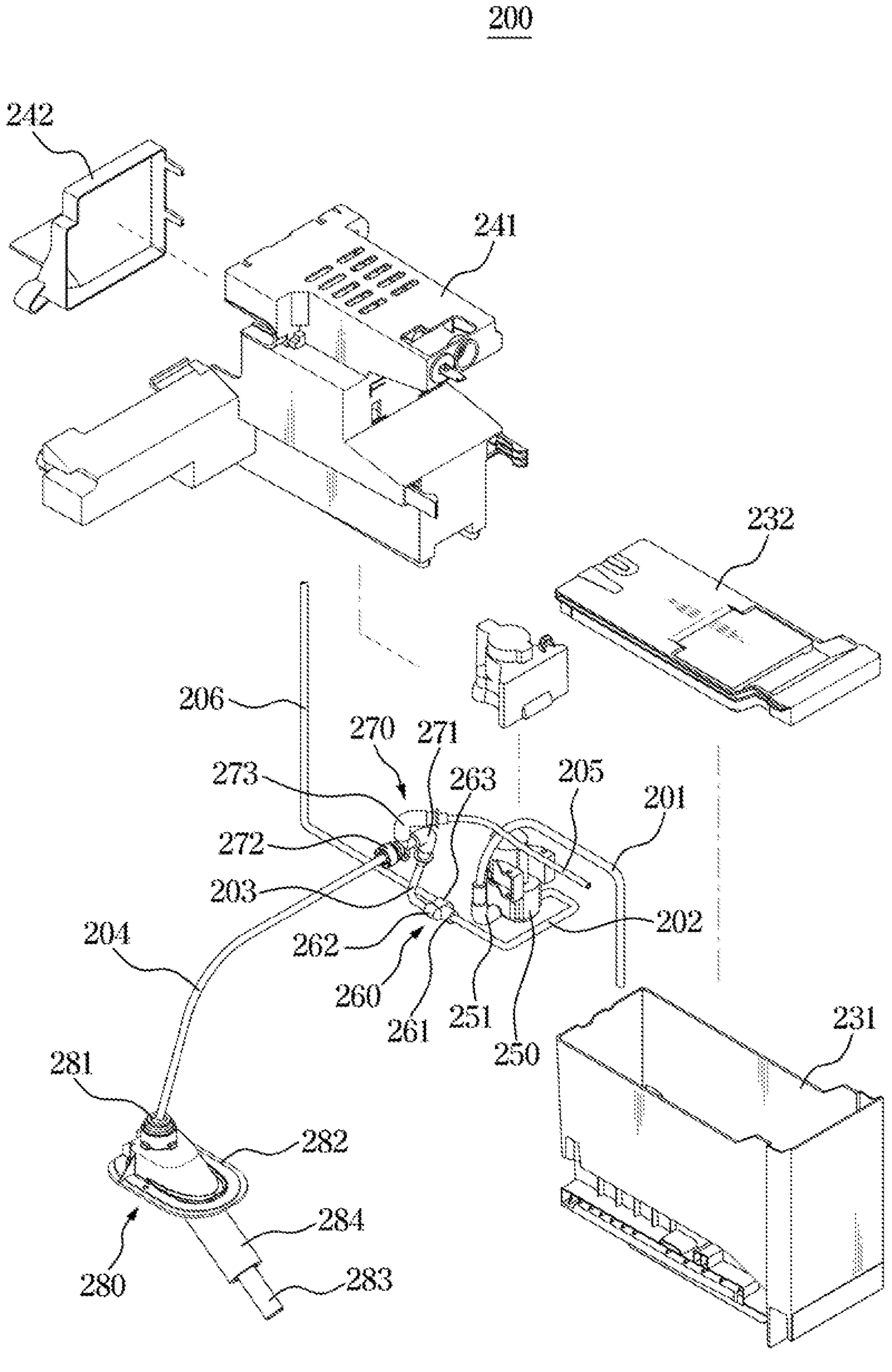
FIG. 15 is a view illustrating the water supply device and the water supply flow path structure illustrated in FIG. 14.

FIG. 13 is a schematic view illustrating a water supply flow path of a refrigerator according to another embodiment of the disclosure. FIG. 14 is a view illustrating a water supply device and the water supply flow path structure of the refrigerator according to another embodiment of the disclosure. FIG. 15 is a view illustrating the water supply device and the water supply flow path structure illustrated in FIG. 14.

Hereinafter a refrigerator according to another embodiment of the disclosure will be described in detail with reference to FIGS. 13 to 15.

According to another embodiment of the disclosure, a refrigerator may receive water from a water supply container 230 without receiving water from an external water supply source. The water supply container 230 may be arranged inside the refrigerating compartment 21. The water supply container 230 may be provided to be withdrawable from the refrigerating compartment 21. Accordingly, a user may place the water supply container 230 at a predetermined position in the refrigerating compartment 21 after filling the water supply container 230 with purified water. That is, according to another embodiment of the disclosure, the user can directly supply water to the water supply container 230, and water may be supplied from the water supply container 230 to the ice maker 24, the dispenser 61 and the automatic water supply device 71. According to another embodiment of the disclosure, the refrigerator may include a single ice maker 24. Alternatively, the refrigerator may include a plurality of ice makers.

Water supply flow paths 201, 202, 203, 204, 205 and 206 according to another embodiment of the disclosure will be described with reference to FIG. 15.

A user may periodically supply purified water to the water supply container 230. As described above, the water supply container 230 may be arranged on one side of the refrigerating chamber 21. A pump 250 may be provided in the refrigerating compartment 21 to supply water from the water supply container 230 to the ice maker 24 or the second control valve 80. The pump 250 may pump the water in the water supply container 230 to move the water to a rear end of the water supply flow path.

The water supply flow paths 201, 202, 203, 204, 205 and 206 may include first water supply flow paths 201, 202, 203, 204 and 205 provided to supply water from the water supply container 230 to the ice maker 24, and second water supply flow path 201, 202, 203, and 206 provided to supply water from the water supply container 230 to the second control valve 80.

The first water supply flow paths 201, 202, 203, 204, and 201, 202, 203, 205 and the second water supply flow paths 201, 202 and 206 may be formed to diverge at one point on the water supply flow path. A third control valve 260 may be provided at a branch point at which the first water supply flow paths 201, 202, 203, 204 and 201, 202, 203, 205 and the second water supply flow paths 201, 202 and 206 diverge.

The third control valve 260 may guide the water supplied from the water supply container 230 to the ice maker 24 or the second control valve 80. The third control valve 260 may have the same shape as a three-way valve. The third control valve 260 may include a third inlet port 261, a sixth outlet port 262 provided to supply water to the ice maker 24, and a seventh outlet port 263 provided to supply water to the second control valve 80.

The first water supply flow paths 201, 202, 203, 204, and 201, 202, 203, 205 may include a first flow path 201 provided to guide water from the water supply container 230 to the pump 250, a second flow path 202 provided to guide water from the pump 250 to the third control valve 260, a third flow path 203 provided to guide water from the sixth outlet port 262 of the third control valve 260 to a return valve 270, a fourth flow path 204 provided to guide water from the return valve 270 to the ice maker 24, and a collection flow path 205 provided to connect the return valve 270 to the water supply container 230.

Water in the water supply container 230 may be pumped by the pump 250 and supplied to the return valve 270 through the first flow path 201, the second flow path 202, and the third flow path 203. The return valve 270 may have the same shape as a three-way valve. The return valve 270 may not be configured to selectively open and close the fourth flow path 204 and the collection flow path 205. A first outlet 272 and a second outlet 273 of the return valve 270 may be provided to maintain an open state. The water supplied to the return valve 270 may be supplied to the ice maker 24 through the fourth flow path 204. In response to the inside of the fourth flow path 204 being blocked due to the reason such as that the water inside the fourth flow path 204 is frozen, the water supplied to the return valve 270 may be collected to the water supply container 230 through the collection flow path 205.

The second water supply flow paths 201, 202 and 206 may include a first flow path 201 provided to guide water from the water supply container 230 to the pump 250, a second flow path 202 provided to guide water from the pump 250 to the third control valve 260, and a fifth flow path 206 provided to guide water from the seventh outlet port 263 of the third control valve 260 to the second control valve 80. A method of supplying the water supplied from the second control valve 80 to the dispenser 61 or the automatic water supply device 71 is the same as the above description, and thus a description thereof will be omitted.

Referring to FIGS. 14 and 15, the water supply container 230 may include a container 231 including an open upper surface, and a container cover 232 provided to cover the upper surface of the container 231.

The first flow path 201 may be provided to connect the container 231 to the pump 250. One end of the first flow path 201 may be arranged adjacent to a lower surface of the container 231, and the other end of the first flow path 201 may be connected to an inlet 251 of the pump 250.

The second flow path 202 may connect an outlet (not shown) of the pump 250 to the third inlet port 261 of the third control valve 260.

The third flow path 203 may connect the sixth outlet port 262 of the third control valve 260 to an inlet 271 of the return valve 270.

The fourth flow path 204 may connect a first outlet 272 of the return valve 270 to a hose insertion portion 281 of a water supply device 280. The water supply device 280 may have the same structure as the first water supply device 170.

The fifth flow path 206 may connect the seventh outlet port 263 of the third control valve 260 to the second control valve 80.

One end of the collection flow path 205 may be connected to the second outlet 273 of the return valve 270. The other end of the collection flow path 205 may be located above the container 231. The other end of the collection flow path 205 may not be connected to the water accommodated in the container 231 to allow air to be introduced through the other end of the collection flow path 205. That is, the other end of the collection flow path 205 may be positioned higher than a full water level of the container 231. In addition, the other end of the collection flow path 205 may be positioned higher than the fourth flow path 204. The other end of the collection flow path 205 may be positioned higher than the fourth flow path 204 in the entire section of the fourth flow path 204.

As described above, because air is introduced through the other end of the collection flow path 205, residual water may not remain in the fourth flow path 204. In a state in which the collection flow path 205 is not provided, when the operation of the pump 205 is stopped, residual water may remain in the fourth flow path 204. That is, water may accumulate in the fourth flow path 204, and the water may be frozen, thereby blocking the fourth flow path 204. According to another embodiment of the disclosure, the other end of the collection flow path 205 provided to communicate with the fourth flow path 204 may be provided to communicate with the outside air. The fourth flow path 204 may communicate with the atmosphere through the collection flow path 205, and water may be discharged to the outside of the fourth flow path 204 without accumulating in the fourth flow path 204 due to atmospheric pressure. Accordingly, it is possible to prevent the water inside the fourth flow path 204 from freezing and blocking the fourth flow path 204. Further, even if the fourth flow path 204 is blocked, water may be collected to the water supply container 230 through the collection flow path 205. That is, it is possible to prevent water from flowing backward or overflowing into the refrigerating compartment 21.

As is apparent from the above description, a refrigerator may include a water supply flow path provided to supply water from an external water supply source to a dispenser, an automatic water supply device, and an ice maker.

Further, a refrigerator may include a water supply flow path provided to supply water from a water supply container, which is filled by a user, to a dispenser, an automatic water supply device, and an ice maker.

Further, a refrigerator may prevent residual water from accumulating on a water supply flow path provided to supply water to an ice maker.

Although a few embodiments of the disclosure have been shown and described, it would be appreciated by those skilled in the art that changes may be made in these embodiments without departing from the principles and spirit of the disclosure, the scope of which is defined in the claims and their equivalents.

What is claimed is:

1. A refrigerator comprising:

a body comprising a storage compartment, the storage compartment comprising a first storage compartment, and a second storage compartment, and a partition wall to separate the storage compartment into the first storage compartment and the second storage compartment;

a first control valve configured to control a flow of water received from an external water supply source, the first control valve arranged in the first storage compartment;

an ice maker connected to the first control valve and configured to generate ice using the water discharged from the first control valve, the ice maker arranged in the second storage compartment;

a second control valve connected to the first control valve and configured control a flow of the water discharged from the first control valve;

a dispenser comprising an operating lever, connected to the second control valve and configured to supply the water received from the second valve by an operation of the operating lever;

a water supplier configured to supply the water received from the first control valve to the ice maker by penetrating the partition wall; and an automatic water supplier, connected to the second control valve, configured to supply the water received from the second valve to a water container and configured to control the water container to be filled with a predetermined amount of water, wherein the first control valve selectively guides the water received from the external water supply source to the ice maker or to the second control valve, and the second control valve selectively guides the water received from the first control valve to the dispenser or the automatic water supplier.

2. The refrigerator of claim 1, wherein the ice maker comprises:

a first ice maker configured to generate a first type of ice; and a second ice maker configured to generate a second type of ice which is different from the first type and arranged in parallel with the first ice maker.

3. The refrigerator of claim 2, wherein the first control valve comprises:

a first inlet port connected to the external water supply source to receive water therethrough;

a first outlet port to discharge the water received from the external water supply source to the first ice maker therethrough;

a second outlet port to discharge the water received from the external water supply source to the second ice maker therethrough; and a third outlet port to discharge the water received from the external water supply source to the second control valve therethrough.

4. The refrigerator of claim 3, further comprising:

a water filter disposed between the external water supply source and the first control valve to purify water supplied from the external water supply source; and a water tank disposed between the first control valve and the second control valve to store water purified by the water filter.

5. The refrigerator of claim 3, wherein the second control valve comprises:

a second inlet port connected to the third outlet port of the first control valve to receive the water discharged from the first control valve;

a fourth outlet port to supply the water received from the first control valve to the dispenser; and a fifth outlet port to supply the water received from the first control valve to the automatic water supplier.

6. The refrigerator of claim 1, further comprising:

a flow path formed by connecting the first control valve to the ice maker, and comprising a connection pipe provided upstream of the flow path and a connection hose provided downstream of the flow path, wherein an inner diameter of the connection hose is greater than an inner diameter of the connection pipe.

7. The refrigerator of claim 6, wherein the connection hose comprises an inlet through which water is introduced, an outlet through which water is discharged, and a bent portion disposed between the inlet and the outlet, wherein the bent portion is positioned lower than a position of the inlet.

8. The refrigerator of claim 1, further comprising:

an inner door rotatably coupled to the body and having an inner storage space therein; and an outer door rotatably disposed in front of the inner door to close the inner storage space, wherein the dispenser and the automatic water supplier are disposed in the inner storage space of the inner door.

9. The refrigerator of claim 8, wherein the first control valve is arranged in the first storage compartment, the ice maker is arranged in the second storage compartment, and the second control valve is arranged in the inner door.

10. The refrigerator of claim 1, wherein the first storage compartment and the second storage compartment are arranged vertically, and the partition wall is arranged horizontally.

11. A refrigerator comprising:

a body comprising a storage compartment, the storage compartment comprising a first storage compartment, and a second storage compartment, and a partition wall to separate the storage compartment into the first storage compartment and the second storage compartment;

a water supply container to store water and configured to be withdrawable from the second storage compartment;

a first control valve configured to control a flow of water received from the water supply container;

a pump configured to supply the water stored in the water supply container to the first control valve;

an ice maker connected to the first control valve and configured to generate ice using the water discharged from the first control valve;

a second control valve connected to the first control valve and configured control a flow of the water discharged from the first control valve;

a dispenser comprising an operating lever, connected to the second control valve and configured to supply the water received from the second valve by an operation of the operating lever; and an automatic water supplier, connected to the second control valve, configured to supply the water received from the second valve to a water container and configured to control the water container to be filled with a predetermined amount of water, wherein the first control valve selectively guides the water received from the water supply container by the pump to the ice maker or to the second control valve, and the second control valve selectively guides the water received from the first control valve to the dispenser or the automatic water supplier.

12. The refrigerator of claim 11, further comprising a return valve connected to the first control valve to control a flow of the water discharged from the first control valve to the ice maker.

13. The refrigerator of claim 12, wherein the return valve includes an inlet to receive the water discharged from the first control valve therethrough, a first outlet through which the water received through the inlet is supplied to the ice maker, and a second outlet through which the water received through the inlet is supplied to the water supply container.

14. The refrigerator of claim 12, wherein the second outlet is positioned higher than a position of the first outlet.

15. The refrigerator of claim 13, wherein a collection flow path is formed between the return valve and the water supply container and one end of the collection flow path connected to an upper side of the water supply container is positioned higher than a full water level of the water supply container.

16. The refrigerator of claim 11, wherein the automatic water supplier is configured to supply the water received from the first control valve, which is arranged in the first storage compartment, to the ice maker arranged in the second storage compartment, by penetrating the partition wall.

* * * * *